US007873860B2

United States Patent
Kaiya et al.

(10) Patent No.: US 7,873,860 B2
(45) Date of Patent: *Jan. 18, 2011

(54) EXTERNAL STORAGE AND DATA RECOVERY METHOD FOR EXTERNAL STORAGE AS WELL AS PROGRAM

(75) Inventors: Keiichi Kaiya, Hadano (JP); Masanao Tsuboki, Oiso (JP); Kazuhito Suishu, Odawara (JP)

(73) Assignee: Hitachi, Ltd., Tokyo (JP)

( * ) Notice: Subject to any disclaimer, the term of this patent is extended or adjusted under 35 U.S.C. 154(b) by 163 days.

This patent is subject to a terminal disclaimer.

(21) Appl. No.: 12/254,176

(22) Filed: Oct. 20, 2008

(65) Prior Publication Data

US 2009/0049262 A1 Feb. 19, 2009

Related U.S. Application Data

(63) Continuation of application No. 12/068,379, filed on Feb. 6, 2008, now Pat. No. 7,464,288, which is a continuation of application No. 11/715,925, filed on Mar. 9, 2007, now Pat. No. 7,469,358, which is a continuation of application No. 11/448,860, filed on Jun. 8, 2006, now Pat. No. 7,243,256, which is a continuation of application No. 10/774,470, filed on Feb. 10, 2004, now Pat. No. 7,089,445.

(30) Foreign Application Priority Data

Mar. 20, 2003 (JP) ............................. 2003-076865

(51) Int. Cl.
*G06F 11/00* (2006.01)

(52) U.S. Cl. ....................................................... 714/2

(58) Field of Classification Search ................ 714/2–8, 714/11–13, 15, 16, 20, 21, 26, 31, 32, 27, 714/39, 42, 54
See application file for complete search history.

(56) References Cited

U.S. PATENT DOCUMENTS 4,077,059 A    2/1978    Cordi et al.

(Continued)

FOREIGN PATENT DOCUMENTS

EP            1455275 A2      9/2004

(Continued)

OTHER PUBLICATIONS

Aberdeen Group, Continuous Data Protection: Business Continuity for the Era of Networked Storage, Jul. 2003.

(Continued)

*Primary Examiner*—Nadeem Iqbal
(74) *Attorney, Agent, or Firm*—Mattingly & Malur, P.C.

(57) ABSTRACT

The data is automatically recovered to a desired arbitrary point in an external storage without imposing a burden on the host computer. An application on a host computer instructs data recovery control processing of a disk control apparatus to set a recovery opportunity. It is possible to register arbitrary plural points as a recoverable point by setting a recovery flag included in journal data. In the case in which data is recovered due to occurrence of a failure or the like, the application requests a list showing recovery opportunities which have already been set. The application designates a point to which data is recovered on the basis of the recovery opportunity list. The disk control apparatus recovers the data to the designated point on the basis of a backup disk and a journal disk.

44 Claims, 10 Drawing Sheets

U.S. PATENT DOCUMENTS

| | | | |
|---|---|---|---|
| 4,819,156 A * | 4/1989 | DeLorme et al. | 714/15 |
| 4,823,261 A | 4/1989 | Bank et al. | |
| 5,065,311 A | 11/1991 | Masai et al. | |
| 5,086,502 A | 2/1992 | Malcolm | |
| 5,235,700 A * | 8/1993 | Alaiwan et al. | 714/13 |
| 5,263,154 A | 11/1993 | Eastridge et al. | |
| 5,325,519 A | 6/1994 | Long et al. | 714/15 |
| 5,369,757 A | 11/1994 | Spiro et al. | |
| 5,381,545 A * | 1/1995 | Baker et al. | 714/19 |
| 5,404,508 A | 4/1995 | Konrad et al. | |
| 5,479,654 A | 12/1995 | Squibb | |
| 5,551,003 A | 8/1996 | Mattson et al. | 711/136 |
| 5,555,371 A | 9/1996 | Duyanovich et al. | |
| 5,557,737 A | 9/1996 | Wilhite et al. | 714/5 |
| 5,644,696 A | 7/1997 | Pearson et al. | |
| 5,664,186 A | 9/1997 | Bennett et al. | |
| 5,680,640 A | 10/1997 | Ofek et al. | |
| 5,701,480 A | 12/1997 | Raz | |
| 5,720,029 A | 2/1998 | Kern et al. | |
| 5,724,581 A | 3/1998 | Kozakura | |
| 5,748,985 A | 5/1998 | Kanai | |
| 5,751,997 A | 5/1998 | Kullick et al. | |
| 5,778,393 A | 7/1998 | Blea et al. | |
| 5,829,030 A | 10/1998 | Ishida et al. | 711/135 |
| 5,835,953 A | 11/1998 | Ohran | |
| 5,867,668 A | 2/1999 | Spirakis et al. | |
| 5,870,758 A | 2/1999 | Bamford et al. | |
| 5,974,425 A | 10/1999 | Obermarck et al. | |
| 5,987,575 A | 11/1999 | Yamaguchi | |
| 6,065,018 A | 5/2000 | Beier et al. | |
| 6,070,232 A * | 5/2000 | Ishida et al. | 711/143 |
| 6,081,875 A | 6/2000 | Clifton et al. | |
| 6,119,129 A | 9/2000 | Traversat et al. | 707/202 |
| 6,128,630 A | 10/2000 | Shackelford | |
| 6,154,852 A | 11/2000 | Amundson et al. | |
| 6,158,019 A | 12/2000 | Squibb | 714/13 |
| 6,189,016 B1 | 2/2001 | Cabrera et al. | |
| 6,269,381 B1 | 7/2001 | St. Pierre et al. | |
| 6,269,431 B1 | 7/2001 | Dunham | |
| 6,298,345 B1 | 10/2001 | Armstrong, Jr. et al. | |
| 6,301,677 B1 | 10/2001 | Squibb | 714/13 |
| 6,324,654 B1 | 11/2001 | Wahl et al. | 714/6 |
| 6,353,878 B1 | 3/2002 | Dunham | |
| 6,397,308 B1 | 5/2002 | Ofek et al. | |
| 6,397,351 B1 | 5/2002 | Miller et al. | |
| 6,434,681 B1 | 8/2002 | Armangau | |
| 6,442,706 B1 | 8/2002 | Wahl et al. | 714/6 |
| 6,460,055 B1 | 10/2002 | Midgley et al. | |
| 6,463,501 B1 | 10/2002 | Kern et al. | |
| 6,467,023 B1 | 10/2002 | DeKoning et al. | 711/114 |
| 6,473,775 B1 | 10/2002 | Kusters et al. | |
| 6,539,462 B1 | 3/2003 | Mikkelsen et al. | |
| 6,560,614 B1 | 5/2003 | Barboy et al. | |
| 6,587,970 B1 | 7/2003 | Wang et al. | |
| 6,594,781 B1 | 7/2003 | Komasaka et al. | |
| 6,611,850 B1 | 8/2003 | Shen | |
| 6,618,735 B1 | 9/2003 | Krishnaswami et al. | |
| 6,658,434 B1 | 12/2003 | Watanabe et al. | |
| 6,665,815 B1 | 12/2003 | Goldstein et al. | |
| 6,678,787 B2 | 1/2004 | Petruschka et al. | 711/112 |
| 6,687,749 B1 | 2/2004 | Chavez et al. | |
| 6,691,245 B1 | 2/2004 | DeKoning | 714/6 |
| 6,711,409 B1 | 3/2004 | Zavgren, Jr. et al. | |
| 6,711,572 B2 | 3/2004 | Zakharov et al. | |
| 6,728,747 B1 | 4/2004 | Jenkins et al. | |
| 6,732,123 B1 | 5/2004 | Moore et al. | |
| 6,732,124 B1 | 5/2004 | Koseki et al. | |
| 6,732,125 B1 | 5/2004 | Autrey et al. | |
| 6,732,245 B2 | 5/2004 | Kaiya et al. | 711/162 |
| 6,742,138 B1 | 5/2004 | Gagne et al. | |
| 6,802,025 B1 | 10/2004 | Thomas et al. | |
| 6,816,872 B1 | 11/2004 | Squibb | |
| 6,829,819 B1 | 12/2004 | Crue et al. | |
| 6,839,819 B2 | 1/2005 | Martin | |
| 6,842,825 B2 | 1/2005 | Geiner et al. | |
| 6,883,112 B2 | 4/2005 | Maeda et al. | |
| 6,898,688 B2 | 5/2005 | Martin et al. | |
| 6,910,151 B2 | 6/2005 | Qin et al. | 714/6 |
| 6,915,315 B2 | 7/2005 | Autrey et al. | |
| 6,931,499 B2 | 8/2005 | Delaney et al. | 711/154 |
| 6,978,282 B1 | 12/2005 | Dings et al. | |
| 6,981,114 B1 | 12/2005 | Wu et al. | |
| 6,981,177 B2 | 12/2005 | Beattie | |
| 6,993,537 B2 | 1/2006 | Buxton et al. | |
| 7,024,586 B2 | 4/2006 | Kleiman et al. | |
| 7,036,043 B2 * | 4/2006 | Martin et al. | 714/19 |
| 7,089,445 B2 | 8/2006 | Kaiya et al. | |
| 7,111,136 B2 | 9/2006 | Yamagami | |
| 7,185,227 B2 | 2/2007 | Eguchi et al. | |
| 7,243,256 B2 | 7/2007 | Kaiya et al. | |
| 2001/0010070 A1 | 7/2001 | Crockett et al. | |
| 2001/0049749 A1 | 12/2001 | Katsuragi et al. | |
| 2001/0056438 A1 | 12/2001 | Ito | |
| 2002/0016827 A1 | 2/2002 | McCabe et al. | |
| 2002/0078244 A1 | 6/2002 | Howard | |
| 2002/0103980 A1 | 8/2002 | Crockett et al. | |
| 2003/0074523 A1 | 4/2003 | Johnson | |
| 2003/0115225 A1 | 6/2003 | Suzuki et al. | |
| 2003/0135650 A1 | 7/2003 | Kano et al. | |
| 2003/0135783 A1 * | 7/2003 | Martin et al. | 714/13 |
| 2003/0177306 A1 | 9/2003 | Cochran et al. | |
| 2003/0195903 A1 | 10/2003 | Manley et al. | |
| 2003/0220935 A1 | 11/2003 | Vivian et al. | |
| 2003/0229764 A1 | 12/2003 | Ohno et al. | |
| 2004/0010487 A1 | 1/2004 | Prahlad et al. | |
| 2004/0030837 A1 | 2/2004 | Geiner et al. | |
| 2004/0044828 A1 | 3/2004 | Gibble et al. | |
| 2004/0059869 A1 | 3/2004 | Orsley | |
| 2004/0059882 A1 | 3/2004 | Kedem et al. | |
| 2004/0068636 A1 | 4/2004 | Jacobson et al. | |
| 2004/0088508 A1 | 5/2004 | Ballard et al. | |
| 2004/0117572 A1 | 6/2004 | Welsh et al. | |
| 2004/0128470 A1 | 7/2004 | Hetzler et al. | |
| 2004/0133575 A1 | 7/2004 | Farmer et al. | |
| 2004/0139128 A1 | 7/2004 | Becker et al. | |
| 2004/0153558 A1 | 8/2004 | Gunduc et al. | |
| 2004/0163009 A1 | 8/2004 | Goldstein et al. | |
| 2004/0172577 A1 | 9/2004 | Tan et al. | |
| 2004/0225689 A1 | 11/2004 | Dettinger et al. | |
| 2004/0250033 A1 | 12/2004 | Prahlad et al. | |
| 2004/0250182 A1 | 12/2004 | Lyle et al. | |
| 2005/0027892 A1 | 2/2005 | McCabe et al. | |
| 2005/0039069 A1 | 2/2005 | Prahlad et al. | |
| 2005/0108302 A1 | 5/2005 | Rand et al. | |
| 2005/0193031 A1 | 9/2005 | Midgley et al. | |
| 2005/0256811 A1 | 11/2005 | Pagel et al. | |

FOREIGN PATENT DOCUMENTS

| | | |
|---|---|---|
| GB | 2359393 | 8/2001 |
| JP | 03103941 | 4/1991 |
| JP | 05002517 | 1/1993 |
| JP | 06110618 | 4/1994 |
| JP | 7-121315 A | 5/1995 |
| JP | 11134234 | 5/1999 |
| JP | 11353215 | 12/1999 |
| JP | 2000155708 | 6/2000 |
| JP | 2000330729 | 11/2000 |
| JP | 2001-216185 | 8/2001 |
| JP | 2003503792 | 1/2003 |
| WO | 97/09676 | 3/1997 |
| WO | 01/95640 | 12/2001 |
| WO | 03/092116 | 11/2003 |

WO 03092166 11/2003

OTHER PUBLICATIONS

U.S. Appl. No. 09/588,242, filed Jun. 6, 2000 to Lloyd Alan Poston. "Making ROI a Snap: Leveraging the Power of Snapshot Technology with ComVault TM, QiNetix TM, Quick Recovery", CommVault Systems, 2002, pp. 1-4.

Hunnicutt, Ray et al, "Mission Data Storage Consolidation (MDSC)", Space Ops 2002, Paper ID: T2071, pp. 1-8.

Thatte, Satis M., "Persistent Memory: A Storage Architecture for Object-Oriented Database Systems", ACM/IEEE OODBS 1986, pp. 148-159.

U.S. Appl. No. 09/588,242, filed Jun. 6, 2000, Poston.

Elnozahy, E.N. et al, "A Survey of Rollback-Recovery Protocols in Message-Passying Systems", ACM Computing Surveys, vol. 34, No. 3, Sep. 2002, pp. 375-408.

QiNetix Quick Recovery: Snapshot Management and Recovery, CommVault Systems, 2005, 2 pages.

QiNetix: Quick Recovery for Microsift Exchange, CommVault Systems, 2003, 2 pages.

Park, Taseoon et al, "An Efficient Recovery Scheme for Mobile Computing Environments", Proceedings $8^{th}$ International Conference on Parallel and Distributed Systems, 2001, 8 pages.

Bohannon et al, "Distributed Multi-Level Recovery in Main-Memory Databases", Proceedings of the $4^{th}$ International Conference on Parallel and Distributed Information Systems, 1996, pp. 45-55.

Lomet et al, "Efficient Transparent Application Recovery in Client-Server Information Systmes", Proceedings of 1998 ACM SIGMOD International Conference on Management of Data , 1998, pp. 460-471.

* cited by examiner

EXTERNAL STORAGE AND DATA RECOVERY METHOD FOR EXTERNAL STORAGE AS WELL AS PROGRAM

CROSS-REFERENCE TO RELATED APPLICATION

The present application is a continuation application of U.S. Ser. No. 12/068,379, filed Feb. 6, 2008 now U.S. Pat. No. 7,464,288, which is a continuation of application Ser. No. 11/715,925, filed Mar. 9, 2007 now U.S. Pat. No. 7,469,358; which is a continuation of application Ser. No. 11/448,860, filed Jun. 8, 2006, now U.S. Pat. No. 7,243,256; which is a continuation of application Ser. No. 10/774,470, filed Feb. 10, 2004, now U.S. Pat. No. 7,089,445; which claims priority from Japanese Patent Application No. 2003-76865, filed on Mar. 20, 2003, the entire disclosure of which is incorporated herein by reference.

BACKGROUND OF THE INVENTION

The present invention relates to, for example, an external storage, such as a disk device, and a data recovery method for the external storage, as well as a program to control the external storage.

In a business application program (database system) for handling a relatively large amount of data, data is saved in a disk array apparatus which is formed separately from a host computer. Then, a database system of the host computer accesses data on the disk array apparatus to perform various data operations. The disk array apparatus is constituted by arranging plural disk devices in an array and is adapted to operate according to a writing instruction, a reading instruction, or the like from the host computer.

Here, in the case in which a failure occurs during operation of the database system due to, for example, an unexpected loss of power, a mistake in operation by an operator, a malfunction of a hardware circuit or other programs, there is a need to the recover contents of the database to a state that was in existence before the occurrence of the failure. In addition, other than the case of a failure, an operator may wish to date back a data operation to a desired paint in time.

As a first conventional technique, in an ordinary database system, the database system itself on a host computer writes journal data (log data) to a predetermined disk device of a disk array apparatus separately from the actual data. Therefore, in the ordinary database system, the database system itself reads out the journal data from the disk device on the basis of backup data, which has been acquired in advance, and it sequentially reflects the journal data on the backup data. Consequently, the database system on the host computer can restore the database to a desired point in time to the extent that the journal data remains.

In a second conventional technique, the contents of a first disk device are saved in a disk device for backup at a predetermined period, and, at the same time, journal data is saved in a disk device for a journal. In the case in which a failure occurs in the first disk device, a virtual first disk device is generated in a second disk device on the basis of the backup data and the journal data, and data access to the first disk device is internally switched to the virtual first disk device. Then, when recovery of the first disk device is completed, the contents of the virtual first disk device are transferred to the first disk device (e.g., see JP-A-6-110618).

In the first conventional technique, the database system itself on the host computer manages the journal data and is capable of restoring data to an arbitrary point. However, since the database system itself performs a data restoration operation, computer resources (an arithmetic operation unit, a memory, etc.) of the host computer are used for data restoration processing, which results in a decrease in the processing efficiency of the original processing and other business processing during the restoration work. In addition, although the database system performs management of the journal data, if a storage disk for the journal data is fully occupied, the data cannot be restored unless backup data is secured. Therefore, the database system is required to even perform capacity management or the like for the disk for journal data, which leads to an increase in the processing load. Moreover, in the case in which generation management of data is performed, since backup data for plural generations is created, the processing burden is further increased.

In the second conventional technique, data restoration work can be performed without suspending the processing which is being executed by switching the access to the virtual disk device. However, data can be recovered only to an immediately preceding state, and the operator cannot restore the data to a desired arbitrary point.

SUMMARY OF THE INVENTION

The present invention has been devised in view of the above-mentioned problems, and it is an object of the present invention to provide an external storage and a data recovery method for the external storage, as well as a program which can restore data to an arbitrary point without increasing the processing burden on the host computer side. Other objects of the present invention will be obvious from descriptions of various embodiments to be considered later.

In order to solve the above-mentioned problems, an external storage in accordance with a first example of the present invention is connected to a host computer, which external storage includes: storing means which stores data to be used by the host computer; and control means which controls the storing means. The control means includes: registering means which registers a recoverable point to be set by the host computer concerning data stored in the storing means; information for selection sending means which sends information for selection at the registered recoverable point to the host computer in response to a request from the host computer; and recovering means which recovers data designated by the host computer to a designated recoverable point on the basis of the information for selection at the recoverable point.

As the storing means, for example, a storage constituted by arranging plural disk devices in an array can be used. The host computer can set a recoverable point concerning data to be stored in the storing means. The recoverable point is represented by information indicating a point to which the data can be recovered and is also referred to as a restoration point. The recoverable point, which is set by the host computer regularly or irregularly, is registered by the registering means.

In the case in which restoration of data is required due to the occurrence of a failure or the like, the host computer requests the information for selection at the recoverable point from the control means. In response to this request, the information for selection sending means sends the information for selection to the host computer. The information for selection is information for selecting a recoverable point and can be displayed, for example, in a list format.

The host computer selects a point to which the data is desired to be recovered on the basis of the received information for selection. The recoverable point selected by the host computer is communicated to the recovering means. Then, the recovering means recovers the data designated by the host computer to the designated point. The recovering means can restore the data by, for example, sequentially reflecting journal data up to the designated recovery point on backup data. Consequently, the data can be recovered to an arbitrary point in the external storage without practically using computer resources of the host computer.

The registering means is capable of registering arbitrary plural points, which are set by the host computer, as the recoverable point. In other words, the registering means can register not only an immediately preceding latest state but also arbitrary plural points. For example, the host computer can set a recoverable point automatically or according to a manual operation by an operator every time update processing (commitment) is requested or every time a data operation is finished.

In an aspect of the present invention, the storing means has journal data storing means which acquires journal data for storage, and the registering means associates mark information with a predetermined position of the journal data on the basis of an instruction from the host computer to thereby register the recoverable point. In other words, the journal data storing means in the external storage independently collects and stores the journal data automatically. Then, the registering means associates the mark information with the predetermined position of the journal data on the basis of a setting from the host computer to thereby register the recoverable point. The mark information can be included in the journal data or it can be managed as data separate from the journal data, and both the data can be associated with a unique identification code or the like.

In an aspect of the present invention, the journal data includes at least writing data, a writing position, and recovery flag information serving as the mark information. The registering means sets predetermined recovery flag information in the journal data to thereby register the recoverable point.

A data structure of the journal data is extended by adding a recovery flag. A data area for setting a recovery flag is included in all journal data in advance. In the case in which a recoverable point is set for certain data, a recovery flag corresponding to the data is set. If the recovery flag is reset, the set recoverable point can be cancelled.

Moreover, in an aspect of the present invention, the storing means has backup data storing means which stores backup data, and the control means has journal data managing means. Further, in the case in which the free space of the journal data storing means has become insufficient, the journal data managing means transfers the oldest journal data stored in the journal data storing means to the backup data storing means to increase the free space of the journal data storing means and notifies the host computer that the oldest recoverable point among registered recoverable points has been changed.

Recovery of data is realized by, for example, sequentially reflecting journal data up to a target point on backup data at a certain point (a roll forward system). Therefore, in the case in which the journal data does not exist, data can be dated back only to a point when it was backed up. On the other hand, the journal data is an aggregate of data update histories and increases day after day. When the amount of saved journal data reaches the storage capacity of a disk device, journal data more beyond that cannot be stored. Thus, in the case in which the free space for the journal data has become insufficient, the oldest data is transferred to backup data in a necessary amount out of journal data accumulated already to secure a free space. The necessary amount of data to be transferred may be a fixed value set in advance or it may be changed dynamically according to various factors, such as the accumulation speed of the journal data and the storage capacity of the backup data storing means. Here, transferring the oldest journal data to the backup data means reflecting the oldest journal data on the backup data and then deleting the oldest journal data. Note that, as long as there is an unused storage area the in storing means, it is also possible to automatically extend a journal data storage area and, in the case in which the unused storage area has become insufficient, transfer the oldest journal data to the backup data.

A data recovery method for an external storage in accordance with a second example of the present invention operates to recover data of an external storage, which is connected to a host computer, which method includes: a registration step of registering a recoverable point which can be set to arbitrary plural points by the host computer concerning stored data; a list transmission step of sending information for selection of the registered recoverable point to the host computer in response to a request from the host computer; and a recovery step of recovering data designated by the host computer to a designated recoverable point on the basis of the information for selection at the recoverable point.

The registration step, the list transmission step, and the recovery step may be executed in this order, or they may be executed in a different order, for example, in parallel.

A program in accordance with a third example of the present invention is a program for controlling an external storage connected to a host computer, in which the external storage has storing means which stores data to be used by the host computer, and the program realizes, on a computer of the external storage, registering means which registers a recoverable point to be set to arbitrary plural points by the host computer concerning data stored in the storing means; information for selection sending means which sends information for selection at the registered recoverable point to the host computer in response to a request from the host computer; and recovering means which recovers data designated by the host computer to a designated recoverable point on the basis of the information for selection at the recoverable point.

A program in accordance with a fourth example of the present invention is a program for controlling a host computer using an external storage, and the program realizes, on the host computer, registration instructing means which instructs and causes the external storage to register a recoverable point which can be set at arbitrary plural points concerning data stored in the external storage; information for selection requesting means which requests information for selection at the recoverable point registered in the external storage; and recovery instructing means which instructs the external storage to recover desired data to a desired recoverable point on the basis of the information for selection received from the external storage.

This program can be provided, for example, in a form such as an API (Application Program Interface) and can be used preferably from various business application programs.

For example, the program in accordance with the present invention can be fixed in various storage media, such as a disk type storage medium and a semiconductor memory, and placed on the market, or it can be distributed from a server via a communication network.

DESCRIPTION OF THE PREFERRED EMBODIMENTS

Figure 1:
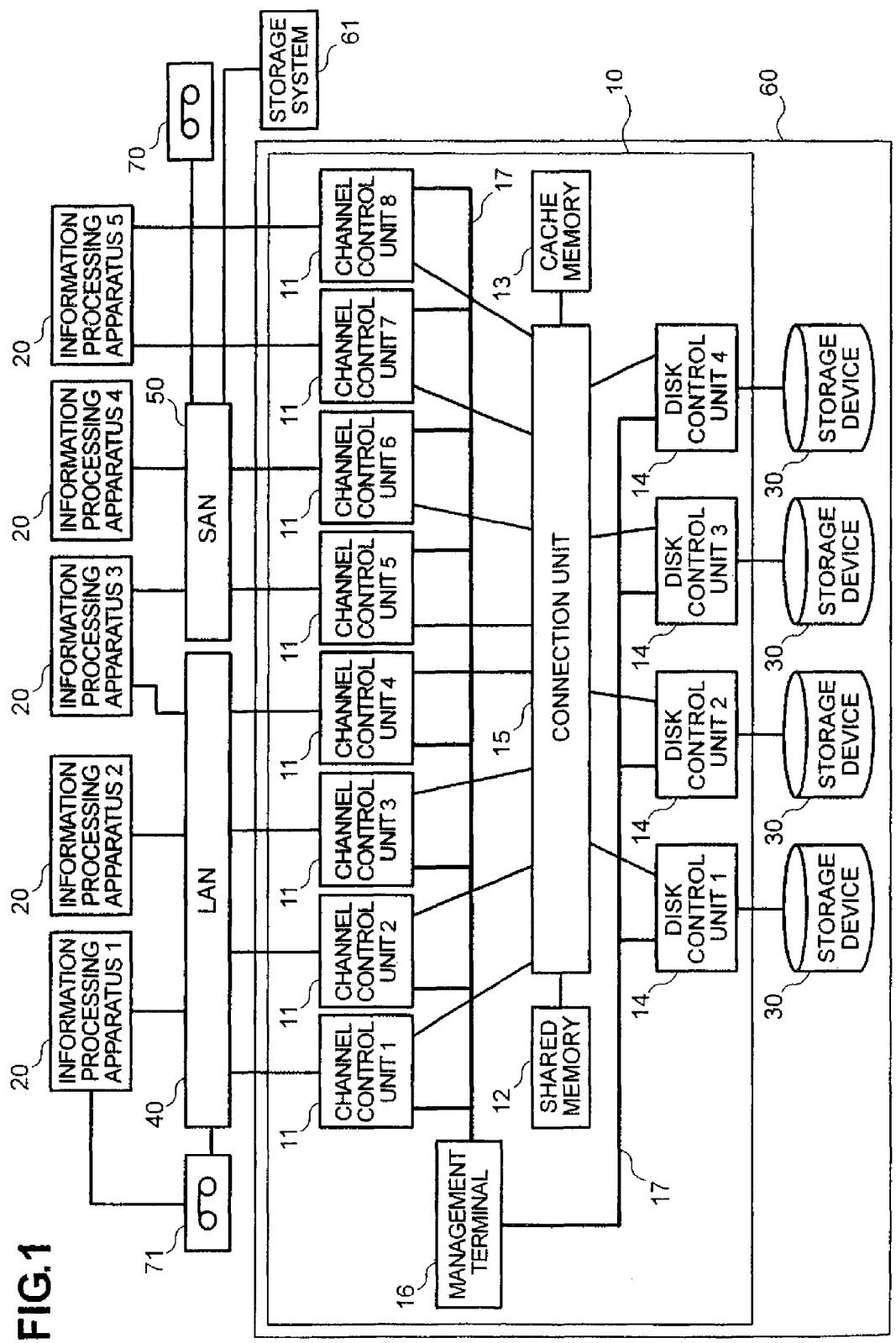
FIG. 1 is a block diagram of an external storage system in accordance with a first embodiment of the present invention.

Embodiments of the present invention will be described hereinafter on the basis of FIGS. 1 to 10.

First of all, an overall outline of an external storage system will be described with reference to FIG. 1.

A storage system 60 includes a storage device controller 10 and plural storage devices 30. The storage device controller 10 performs control with respect to the storage devices 30 in accordance with commands received from information processing apparatuses 20. For example, upon receiving data input/output requests from the information processing apparatuses 20, the storage device control apparatus 10 performs input/output processing for data stored in the storage devices 30. A logical volume (Logical Unit) (hereinafter abbreviated as LU) is set on physical storage areas provided by disk drives included in the storage devices 30. The LU is a logical storage area, and data is stored on this LU. In addition, the storage device controller 10 also exchanges various commands for managing the storage system 60 with the information processing apparatuses 20.

The information processing apparatuses 20 are computer systems which include CPUs (Central Processing Units), memories, and the like. The CPUs of the information processing apparatuses 20 execute various programs, whereby various functions are carried out. The information processing apparatuses 20, for example, may be personal computers or work stations, or they may be mainframe computers. In FIG. 1, for convenience of explanation, five information processing apparatuses are illustrated. In order to identify the respective information processing apparatuses 20, in FIG. 1, consecutive numbers are affixed so as to designate "information processing apparatus 1", "information processing apparatus 2", and the like to indicate the first to the fifth information processing apparatuses 20. Channel control units 11 and disk control units 14, which will be described later, are also distinguished by affixing consecutive numbers thereto in the same manner.

The first to the third information processing apparatuses 20 are connected to the storage device controller 10 via a LAN (Local Area Network) 40. The LAN 40 may be, for example, the Internet or a private network. Data communication between the first to the third information processing apparatuses 20 and the storage device controller 10 is performed via the LAN 40 in accordance with, for example, the TCP/IP (Transmission Control Protocol/Internet Protocol). A data access request according to file name designation (a data input/output request by a unit of file; hereinafter referred to as "file access request") is sent from the first to the third information processing apparatuses 20 to the storage system 60.

A backup device 71 is connected to the LAN 40. As the backup device 71, for example, a disk type storage device such as an MO (magneto-optic: magneto-optical storage), a CD-R (CD-Recordable: readable/writable compact disk), or a DVD-RAM (Digital Versatile Disk-RAM: readable/writable DVD) or a tape type storage device such as a AT (Digital Audio Tape), a cassette tape, an open tape, or a cartridge tape can be used. The backup device 71 performs communication with the storage device controller 10 via the LAN 40 to thereby store backup data of the data stored in the storage devices 30. In addition, the backup device 71 can also be constituted so as to be connected to the first information processing apparatus 20. In this case, the backup device 71 is adapted to acquire backup data of the data stored in the storage devices 30 via the first information processing apparatus 20.

The storage device controller 10 performs communication with the first to the third information processing apparatuses 20 and the backup device 71 via the LAN 40 through the first to the fourth channel control units 11. The first to the fourth channel control units 11 receive file access requests from the first to the third information processing apparatuses 20 individually. In other words, network addresses (e.g., IP addresses) on the LAN 40 are allocated to the first to the fourth channel control units 11, respectively, and the first to the fourth channel control units 11 are adapted to behave as NASs Network Attached Storages), respectively. The first to the fourth channel control units 11 are capable of providing the first to the third information processing apparatuses 20 with services as NASs as if the first to the fourth channel control units 11 are independent NASs, respectively. The first to the fourth channel control units 11 hereinafter will be designated as CHNs. In this way, one storage system 60 is constituted so as to include the first to the fourth channel control units 11, which provide services as NASs, respectively, whereby WAS servers, which have been operated individually by independent computers conventionally, are integrated in the one storage system 60. Consequently, a comprehensive operation of the storage system 60 becomes possible, and the efficiency of maintenance work, such as various settings/controls, failure management, and version maintenance can be realized.

Note that the first to the fourth channel control units 11 of the storage device controller 10 are realized by, for example, hardware formed on a circuit substrate, which is integrally constituted as a unit, an OS (Operating System) which is executed by this hardware, and software, such as an application program, which runs on this OS. In the storage device system 60, functions which have been implemented as a part of hardware conventionally are realized by the software. Therefore, by using the storage system 60, a system operation with a lot of flexibility becomes possible, and it becomes possible to meticulously cope with user needs which are diverse and change rapidly.

The third and the fourth information processing apparatuses 20 are connected to the storage device controller 10 via an SAN (Storage Area Network) 50. The SAN 50 is a network for exchanging data with the third and the fourth information processing apparatuses 20 in the form of a data block, which is a management unit of data in storage areas provided by the storage devices 30, as a unit. Communication between the third and the fourth information processing apparatuses 20 and the storage device controller 10, which is performed via the SAN 50, generally complies with fiber channel protocol. A data access request by a unit of a block (hereinafter referred to as a block access request) is sent from the third and the fourth information processing apparatuses 20 to the storage system 60 in accordance with the fiber channel protocol.

A SAN-compatible backup device 70 is connected to the SAN 50. The SAN-compatible backup device 70 performs communication with the storage device controller 10 via the SAN 50 to thereby store backup data consisting of data stored in the storage devices 30.

The storage device control apparatus 10 performs communication between the third and the fourth information processing apparatuses 20 and the SAN-capable backup device 70 via the SAN 50 using the fifth and the sixth channel control units 11. The fifth and the sixth channel control units 11 hereinafter will be designated as CHF5.

In addition, the fifth information processing apparatus 20 is directly connected to the storage device controller 10 without the intervention of the network such as the LAN 40 or the SAN 50. The fifth information processing apparatus 20 may be a mainframe computer, but, naturally, the invention is not limited to this. Communication between the fifth information processing apparatus 20 and the storage device control apparatus 10 complies with communication protocols, for example, FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), and the like. A block access request is sent from the fifth information processing apparatus 20 to the storage system 60 in accordance with these communication protocols.

The storage device controller apparatus 10 performs communication with the fifth information processing apparatus 20 through the seventh and the eighth channel control units 11. The seventh and the eighth channel control units 11 hereinafter will be designated abbreviated as CHA5.

Another storage system 61, which is installed in a site (secondary site) remote from an installation site of the storage system 60 (primary site), is connected to the SAN 50. The storage system 61 is used at a data copying destination in a function of replication or remote copying. Note that the storage system 61 may be connected to the storage system 60 via a communication line, such as an ATM (Asynchronous Transfer Mode), other than by way of the SAN 50. In this case, the channel control unit 11 including an interface for using the communication line (channel extender) is adopted.

Next, the structure of the storage devices 30 will be described. The storage devices 30 include a large number of disk drives (physical disks) and provide the information processing apparatus 20 with a storage area. Data is stored in an LU serving as a logical storage area. As the disk drive, various devices such as a hard disk device, a flexible disk device, and a semiconductor storage can be used. Note that, for example, the storage devices 30 may be adapted to constitute a disk array with plural disk drives. In this case, the storage devices 30 can provide the information processing apparatuses 20 with storage areas with plural disk drives which are managed by RAID (Redundant Array of Independent (Inexpensive) Disks) technology.

The storage device control apparatus 10 and the storage devices 30 may be directly connected as shown in FIG. 1, or they may be indirectly connected via a network. Moreover, the storage device 30 can also be constituted as a device integral with the storage device controller 10.

As the LU which is set in the storage devices 30, there are a user LU accessible from the information processing apparatus 20, a system LU which is used for control of the channel control units 11, and the like. An OS, which is executed in the CHN5 11, is also stored in the system LU. In addition, the respective channel control units 11 are associated with the respective LU in advance. Consequently, an accessible LU is allocated to each of the channel control units 11. In addition, the association can also be set such that one LU is shared by the plural channel control units 11. Note that, in the following description, the user LU may be described as a user disk and the system LU may be described as a system disk. In addition, the LU shared by the plural channel control units 11 may be described as a shared LU or a shared disk.

Next, the structure of the storage device controller 10 will be described. The storage device controller 10 includes the channel control units 11, a shared memory 12, a cache memory 13, the disk control units 14, a connection unit 15, and a management terminal 16.

The channel control units 11 have a communication interface for performing communication with the information processing apparatuses 20 and are provided with a function for exchanging a data input/output command or the like with the information processing apparatuses 20. For example, the CHN5 11 receive file access requests from the first to the third information processing apparatuses 20. Consequently, the storage system 60 can provide the first to the third information processing apparatuses 20 with services as NASs. In addition, the CHFs 11 receive block access requests complying with the fiber channel protocol from the third and the fourth information processing apparatuses 20. Consequently, the storage system 60 can provide the third and the fourth information processing apparatuses 20 with data storage services which are accessible at high speed. In addition, the CHA5 11 receive a block access request complying with a protocol such as FICON, ESCON, ACONARC, or FIBARC from the fifth information processing apparatus 20. Consequently, the storage system 60 can also provide a mainframe computer or the like, such as the fifth information processing apparatus 20, with the data storage service.

The respective channel control units 11 are connected to the management terminal 16 by an internal LAN 17. Consequently, it also becomes possible to send a program or the like to be executed by the channel control units 11 from the management terminal 16 to the channel control units 11 and to cause the channel control units 11 to install the program. The structure of the channel control units 11 will be described later.

The connection unit 15 connects the respective channel control units 11, the shared memory 12, the cache memory 13, and the respective disk control units 14 with each other. Exchange of data and commands among the channel control units 11, the shared memory 12, the cache memory 13, and the disk control units 14 is performed via the connection unit 15. The connection unit 15 is constituted by, for example, a high-speed bar such as an ultra-high speed cross buss switch which performs data transfer according to high-speed switching. Since the channel control units 11 are connected by the high-speed bus, the communication performance among the channel control units 11 is improved compared with the case in which WAS servers operating on individual computers are connected via a LAN. In addition, consequently, a high-speed file sharing function, high-speed fail-over, and the like become possible.

The shared memory 12 and the cache memory 13 are storage memories which are shared by the respective channel control units 11 and the respective disk control units 14. The shared memory 12 is mainly used for storing control information, commands, and the like. The cache memory 13 is mainly used for storing data.

For example, in the case in which a data input/output command, which a certain channel control unit 11 has received from the information processing apparatus 20, is a writing command, the channel control unit 11 writes the writing command in the shared memory 12 and, at the same time, writes writing data received from the information processing apparatus 20 in the cache memory 13. On the other hand, the disk control units 14 monitor the shared memory 12. When it is detected that the writing command is written in the shared memory 12, the disk control units 14 read out the writing data from the cache memory 13 in accordance with the command and write the read-out data in the storage devices 30.

The disk control units 14 perform control of the storage devices 30. For example, as described above, the disk control units 14 perform writing of data in the storage devices 30 in accordance with the writing command which the channel control units 11 has received from the information processing apparatuses 20. In addition, the disk control units 14 change a data access request to the LU according to a logical address designation sent from the channel control units 11 into a data access request to a physical disk according to a physical address designation. In the case in which the physical disks in the storage devices 30 are managed by RAID technology, the disk control units 14 perform access to data in accordance with a RAID constitution. In addition, the disk control units 14 also perform control of copying management and backup control of data stored in the storage devices 30. Moreover, the disk control units 14 also perform control for storing a copy of data of the storage system 60 in the primary site in another storage system 61 which is installed in a secondary site (called a replication function or a remote copy function) and the like with an object of prevention of data loss (recovery from a disaster) and the like at the time of occurrence of a disaster.

The respective disk control units 14 are connected to the management terminal 16 via the internal LAN 17 and are capable of individually communicating with the management terminal 16 each other. Consequently, it is possible to send a program or the like, which the disk control units 14 are caused to execute, from the management terminal 16 to the disk control units 14 and cause it to install the program or the like.

Next, the management terminal 16 will be described. The management terminal 16 is a computer for maintaining and managing the storage system 60. By operating the management terminal 16, the setting of a physical disk constitution in the storage devices 30, the setting of an LU, the installation of a program to be executed by the channel control units 11, and the like can be performed. Here, examples of the setting of a physical disk constitution in the storage devices 30 include addition or reduction of physical disks and the change of a RAID constitution (change from RAID 1 to RAID 5, etc.). Moreover, from the management terminal 16, work such as confirmation of an operation state of the storage system 60, specification of a failed portion, and installation of an OS to be executed by the channel control units 11 can also be performed. In addition, the management terminal 16 is connected to an outside maintenance center by a LAN, a telephone line, or the like and is also capable of performing failure monitoring in the storage system 60 using the management terminal 16, and, if a failure occurs, of promptly coping with the failure. Occurrence of a failure is communicated from, for example, an OS, an application program, driver software, or the like. This notification can be performed by use, for example, of the HTTP (Hyper Text Transfer Protocol), the SNMP (Simple Network Management Protocol), an electronic mail, or the like. Such setting and control can be performed by an operator or the like operating the management terminal 16 with a web page provided by a web server running on the management terminal 16 as a user interface. The operator or the like operates the management terminal 16 to, for example, set an object and contents of failure monitoring and set a failure notification destination.

The management terminal 16 may be incorporated in the storage device controller 10, or it maybe externally attached to the storage device controller 10. In addition, the management terminal 16 may be constituted as a computer which exclusively performs maintenance and management of the storage device controller 10 and the storage device 30, or it may be constituted by giving maintenance and management functions to a general purpose computer.

Figure 2:
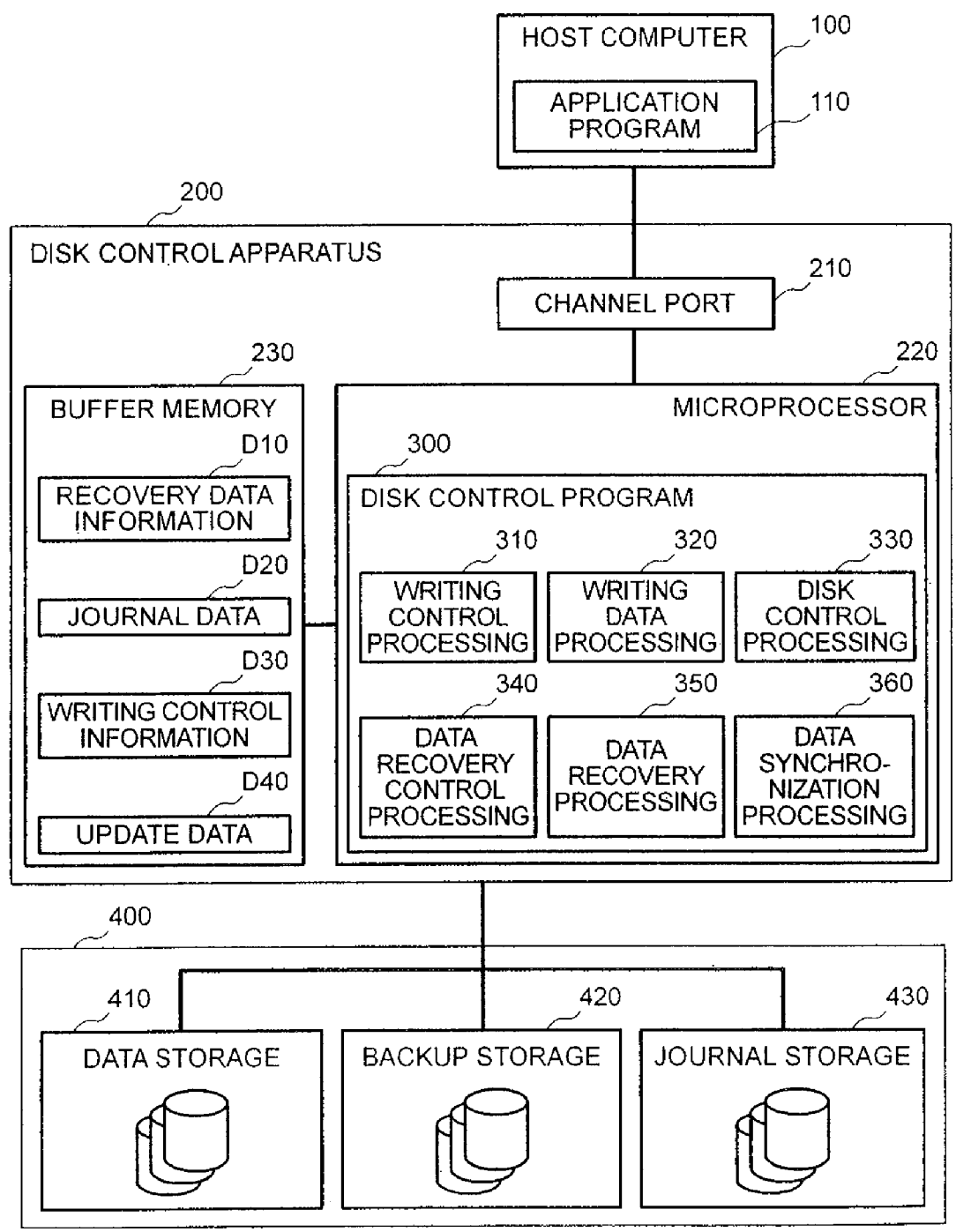
FIG. 2 is a block diagram showing an outline of the storage system shown in FIG. 1.

Next, an example of the data recovery method according to the present invention will be described with reference to FIG. 2. FIG. 2 is a diagram of a main part extracted from the storage system that has been described with reference to FIG. 1. The external storage system shown in FIG. 2 is roughly divided into a host computer 10 and an external storage, which will be described later. The external storage is roughly divided into a disk control apparatus 200 and a mass storage 400. Here, the correspondence between FIG. 1 and FIG. 2 will be briefly described. The storage system 60, the channel control units 11, the shared memory 12 and the cache memory 13, the connection unit 15, the disk control units 14, the storage devices 30, and the information processing apparatuses 20 in FIG. 1 correspond to the disk control apparatus 200, a channel port 210 and a microprocessor 220, a buffer memory 230, a bus, switches, and the like (not shown), the microprocessor 220, a storage 400, and the host computer 100 in FIG. 2, respectively. The microprocessor 220 may exist either on the channel control units 11 side or the disk control units 14 side.

The host computer 100 is constituted by, for example, a personal computer, a work station, or the like, and it includes an application program 110 (hereinafter simply referred to as an application) handling a database. In addition, although not illustrated, the host computer 100 includes a user interface for exchanging information with an operator through, for example, a pointing device, a keyboard, a monitor display, or the like. The application 110 accesses data in the storage 400 via the disk control apparatus 200 to thereby process a predetermined job.

The disk control apparatus 200 controls the storage 400 and includes the channel port 210, the microprocessor 220, and the buffer memory 230.

The microprocessor 220 performs two-way data communication with the host computer 100 via the channel port 210. The microprocessor 220 executes a disk control program 300. Writing control processing 310, writing data processing 320, disk management processing 330, the data recovery control processing 340, the data recovery processing 350, and the data synchronization processing 360 are included in the disk control program 300.

Details of the main processing will be described later. The writing control processing 310 mainly manages writing control information (journal control information) at the time of data writing. The writing data processing 320 performs data writing in a predetermined disk device. The disk management processing 330 mainly performs management of a journal data storage disk 430. The data recovery control processing 340 registers recovery opportunities set from the host computer 100 and sends list data of the registered recovery opportunities to the host computer 100. The data recovery processing 350 recovers data of a designated disk device to a designated point. The data synchronization processing 360 performs backup processing of data according to an instruction from the host computer 100.

For example, recovery data information D10, journal data D20, writing control information D30, and update data D40 are stored in the buffer memory 230. The recovery data information D10 is information providing a history of recovery processing (restoration processing) of data and records, for example, a data recovery destination, a recovery point, and the like. The journal data D20 is an update history of a data operation and is sequentially transferred from the buffer memory 230 to the journal storage disk 430. The writing control information D30 includes information necessary for recovering data at an arbitrary point. The update data D40 is data for which an update is instructed by the application 110 and is transferred from the buffer memory 230 to a data storage disk 410: Note that the data described above need not exist on the buffer memory 230 at the same time. In addition, although the buffer memory 230 is shown as if it is a single memory for convenience of explanation, for example, the buffer memory 230 may be constituted as an aggregate of plural types of memory devices.

The mass storage 400 includes the data storage disk 410, a backup data storage disk 420, and the journal data storage disk 430. Latest data (actual data), which is currently being used, is stored in the data storage disk 410. Backup data at a certain point is stored in the backup data storage disk 420. Journal data is stored in the journal data storage disk 430. Note that the respective disks 410 to 430 are accurately disk devices and include plural disks. A data storage disk, a backup data storage disk, and a journal data storage disk are hereinafter referred to as a data disk, a backup disk, and a journal disk, respectively.

Figure 3:
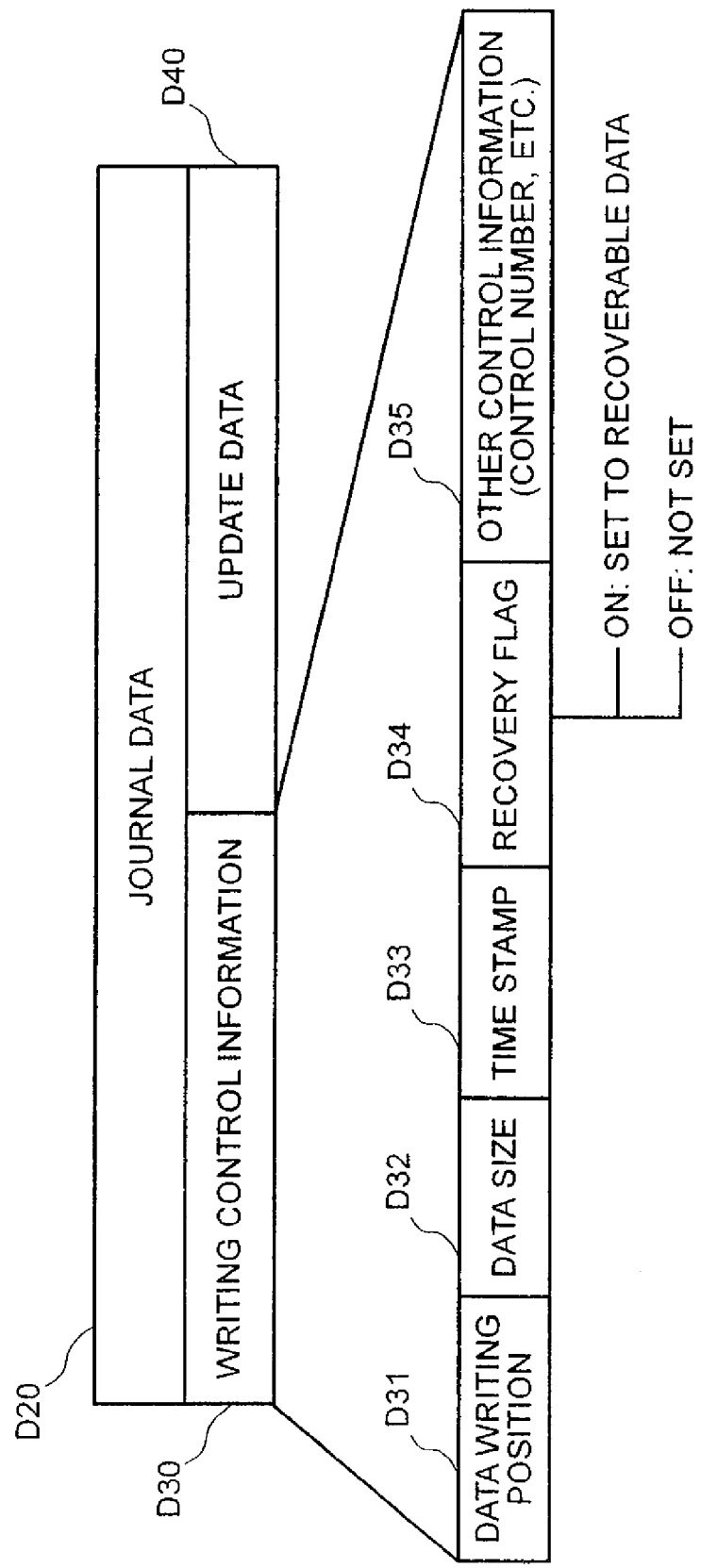
FIG. 3 is a data diagram showing the structure of journal data and writing control information.

FIG. 3 is a data structure diagram schematically showing the structure of the journal data D20 and the writing control information D30.

The journal data D20 according to this embodiment includes the writing control information D30 and the update data (writing data) D40. The writing control information D30 carries out a function as journal control information and includes information such as a data writing position D31, a data size D32, a time stamp D33, a recovery flag D34, and other control information D35. The data writing position D31 is positional information indicating where in which disk device data is written. The data size D32 is information indicating the size of written data. The time stamp D33 is information indicating the data writing time. The recovery flag D34 constitutes mark information indicating a point that represents a recoverable time (restoration point). When the recovery flag D34 is set, the restoration point is set as recoverable data. When the recovery flag D34 is reset, the setting of the restoration point is cancelled. The other control information D35 includes other necessary information such as a control number for uniquely specifying the writing control information D30, a data type, and the like.

In this embodiment, as shown in FIG. 3, the structure of the journal data D20 is independently extended, and the recovery flag D34 is provided in the journal data D20. Consequently, an arbitrary point can be set freely as a recoverable point simply by adding a small amount of data, and data can be recovered to an arbitrary point. However, the structure of the journal data D20 and the recovery flag D34 is not limited to this, and the journal data D20 and the recovery flag D34 may be separated and associated by a unique ID (identification code) or the like.

Figure 4:
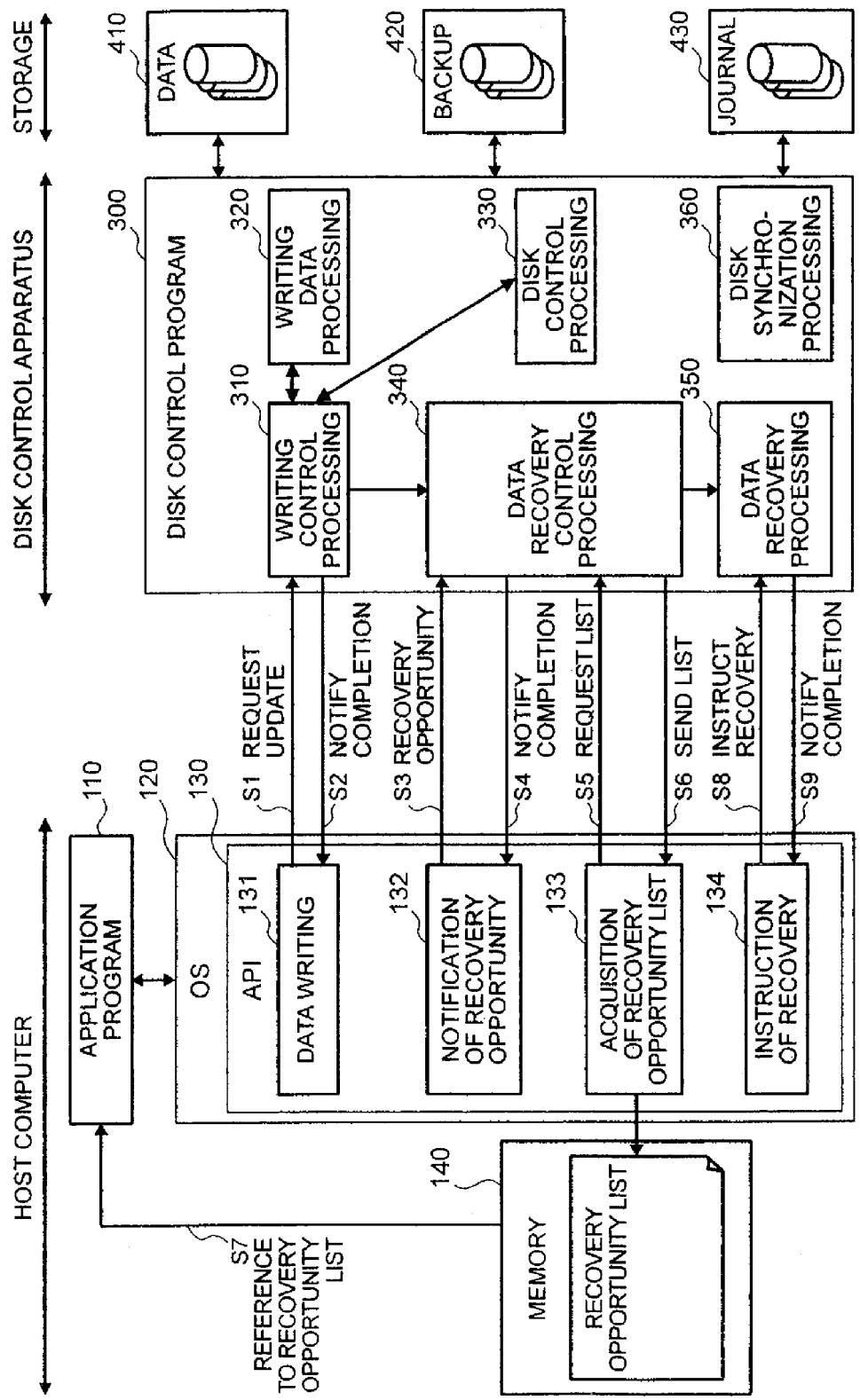
FIG. 4 is a block diagram showing program structures of a host computer and a disk control apparatus.

FIG. 4 is a block diagram showing an outline of program structures of the host computer 100 and the disk control apparatus 200.

The application 110 performs two-way data communication with the disk control program 300 via the OS 120 of the host computer 100. The OS 120 includes an API (Application Program Interface) group 130. An API for data writing 131, an API for recovery opportunity notification 132, an API for recovery opportunity list acquisition request 133, and an API for recovery instruction 134 are included in the API group 130. By calling and using these APIs 131 to 134 appropriately, the application 110 can set a desired point as a recovery opportunity, read out a recovery opportunity list which has already been set, and select a desired point to instruct recovery of data.

An overall operation will be described briefly with reference to FIG. 4. When the application 110 instructs the disk control apparatus 200 to request a data update (request commitment) via the API for data writing 131 (S1), the writing control processing 310 of the disk control program 300 writes data in a predetermined disk via the writing data processing 320 and notifies the application 110 that the update request has been processed (S2).

The application 110 can set, for example, a desired point as a recovery opportunity (restoration point), which is a recoverable point, regularly or irregularly during processing of a job. The application 110 calls the API for a recovery opportunity notification 132 to thereby designate data, for which the recovery opportunity is set, with respect to the disk control device 200 (S3). When the recovery opportunity notification has been effected, the data recovery control processing 340 of the disk control program 300 sets a recovery flag of the designated data and notifies the application 110 that the recovery opportunity has been set (S4).

In the case in which data is to be recovered for some reason, such as the occurrence of a failure, the application 110 calls the API for a recovery opportunity list acquisition request 133 and requests list information at the recoverable point from the disk control apparatus 200 (S5). When a list is requested, the data recovery control processing 340 inspects the journal disk 430 to acquire information on the data for which the recovery flag has been set and prepares a recovery opportunity list. The data recovery control processing 340 returns the recovery opportunity list to the application 110 (S6).

The application 110 selects at least one point, to which recovery is desired, with reference to the recovery opportunity list stored in the memory 140. The application 110 calls the API for a recovery instruction 134 to thereby instruct the disk control apparatus 200 to recover data of a predetermined disk to the desired point (S8). When the recovery instruction is received from the application 110, the data recovery processing 350 uses the backup disk 420 and the journal disk 430 to recover the designated data to the designated point. The recovery processing 350 notifies the application 110 that the recovery processing has been completed (S9).

Figure 5:
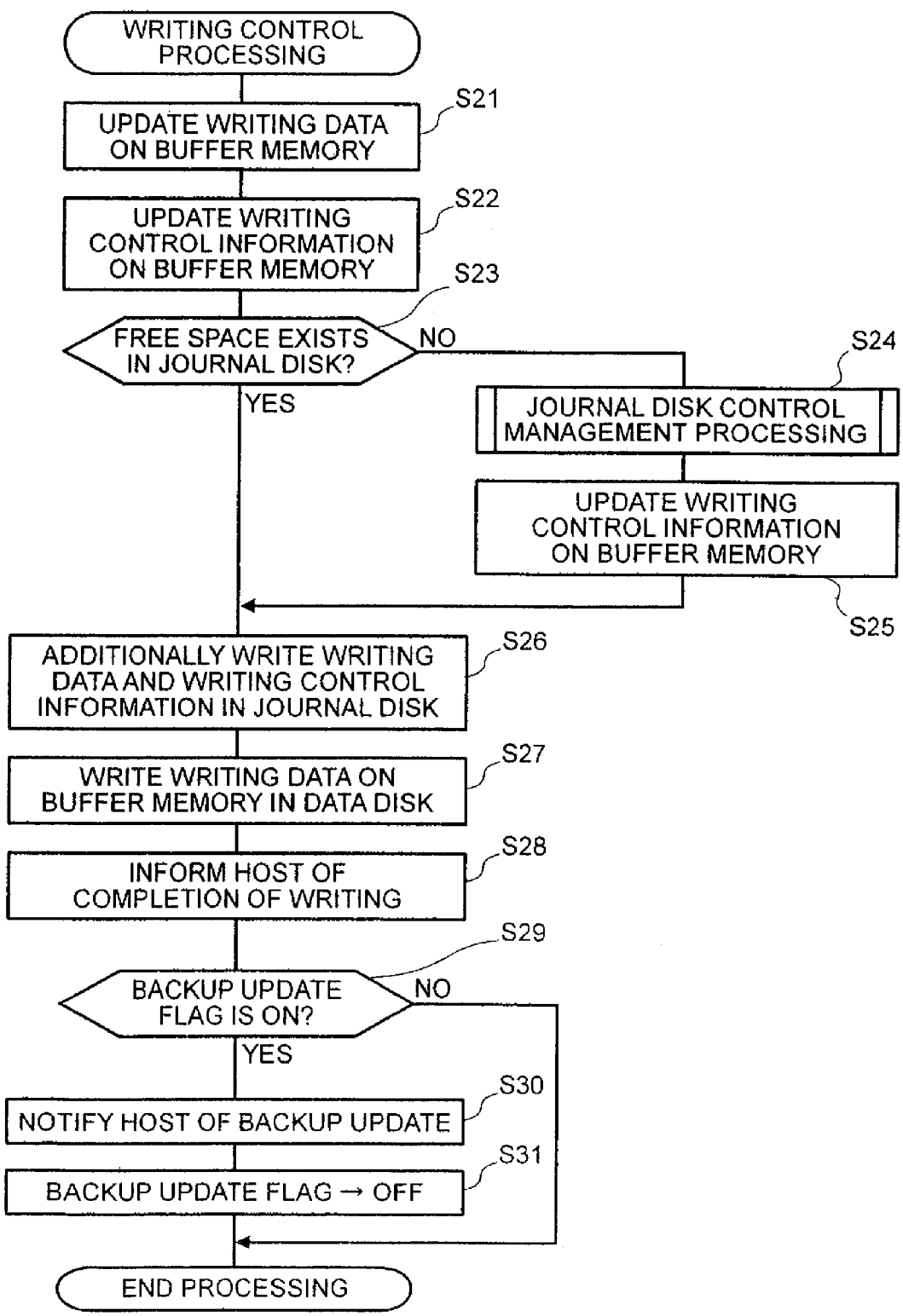
FIG. 5 is a flowchart showing writing control processing.

Next, detailed control of the respective portion will be described with reference to FIGS. 5 to 9. FIG. 5 is a flowchart showing the writing control processing. Note that, as is true of the following description, the illustrated flowchart shows a main part of an operation for understanding of the invention, and it is possible that the flowchart is different from an actual program, In the figures, "step" is abbreviated as "5".

When the application 110 sends a writing request, the data D40 on the buffer memory 230 is updated (S21) and the writing control information D30 on the buffer memory 230 is also updated (S22). Next, the processing judges whether or not there is sufficient free space in the journal disk 430 (S23). For example, this can be judged according to whether or not the present free space of the journal disk 430 exceeds the data size of data which is about to be written. If the free space of the journal disk 430 is insufficient (S23: NO), the processing executes journal disk management processing to be described later with reference to FIG. 6 (524) to secure the free space, and, if necessary, updates the writing control information on the buffer memory 230 (S25). The case in which it is necessary to update the writing control information is, for example, a case in which the writing position of the journal data fluctuates due to journal automatic extension to be described later.

If a sufficient free space exists in the journal disk 430 (S23: YES) and if a sufficient free space is secured in the journal disk 430, the processing additionally writes the writing data D40 and the writing control information D30 (i.e., the journal data D20) in the journal disk 430 (S26). In addition, the processing writes the writing data D40 on the buffer memory 230 in a predetermined position of the data disk 410 (S27) and notifies the host computer 100 (accurately, the application 110 on the host computer 100; this is true of the following description as well) that the data writing has been completed (S28).

Note that S26 and S27 may be performed at a time separate from that of the writing control processing (asynchronously). In that case, for example, the steps can be managed by providing a flag, which indicates whether or not the data is reflected on the disk, in the data on the buffer memory.

Then, the processing judges whether or not a backup update flag is ON (S29). The backup update flag constitutes mark information which indicates that the oldest journal data has been transferred to the backup disk 420 in order to secure a free space on the journal disk 430. Since an oldest point recoverable from backup data is changed by the transfer of the journal data, if the backup update flag is set in an ON state (S29: YES), the processing notifies the host computer 100 that the backup data has been updated (S30). After notifying the host computer 100 of the backup update, the processing resets the backup update flag to an OFF state (S31).

Figure 6:
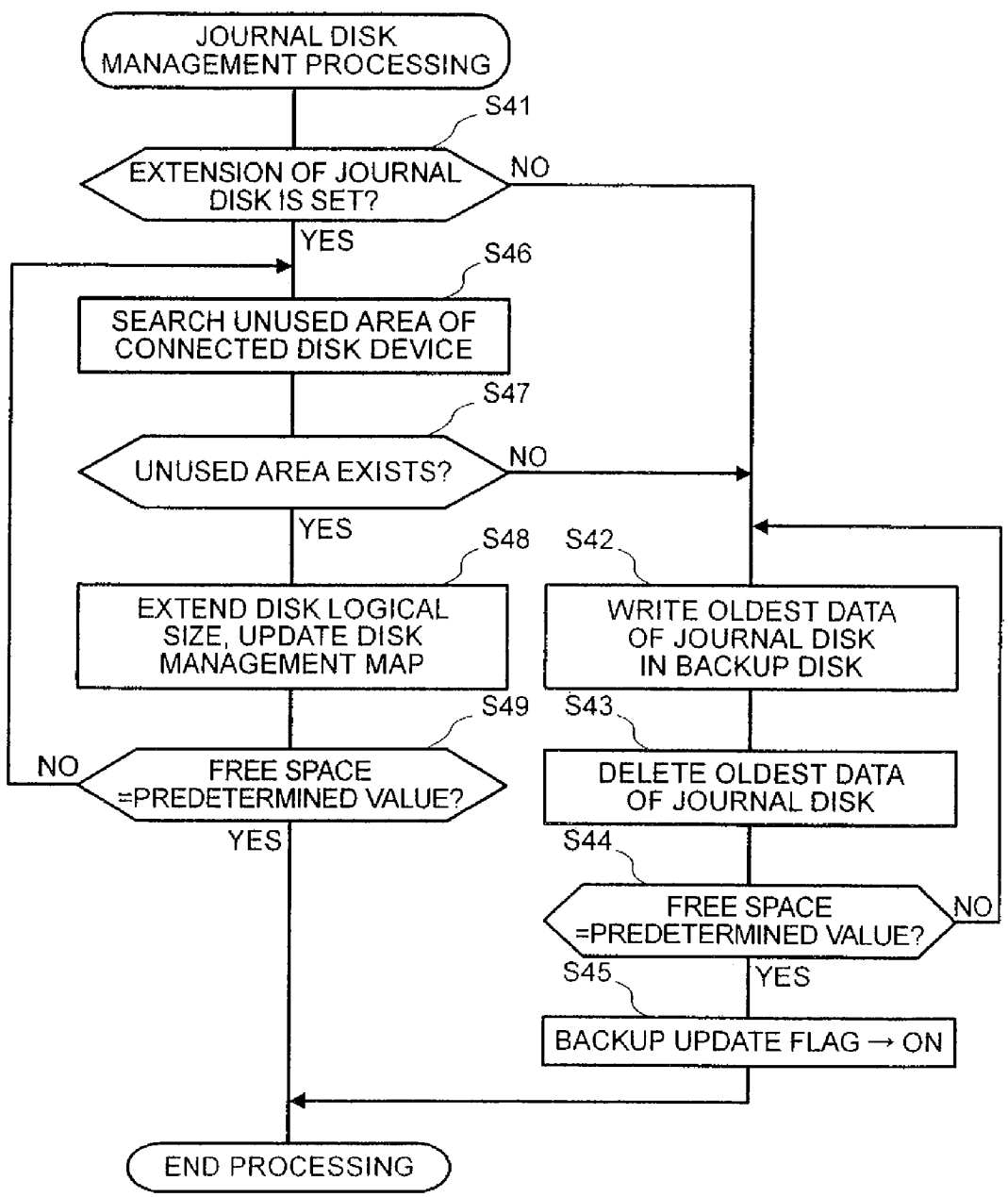
FIG. 6 is a flowchart showing journal disk management processing.

FIG. 6 is a flowchart showing details of the journal disk management processing S24 in FIG. 5. First, the processing judges whether or not an automatic extension mode of the journal disk 430 is set (S41). The automatic extension mode is a mode for searching an unused disk or an unused storage area to automatically increase the logical size of the journal disk 430.

If the automatic extension mode is not set (S41: NO), the processing selects the oldest data among the journal data stored in the journal disk 430 and reflects the oldest data on the backup disk 420 (S42). The oldest journal data transferred to the backup disk 420 is deleted from the journal disk 430 (S43). Consequently, the free space of the journal disk 430 increases. The processing transfers journal data to the backup disk 420 in order from the oldest journal data until the free space of the journal disk 430 reaches a predetermined value (S44). If the free space of the journal disk 430 has reached the predetermined value (S44: YES), the processing sets the backup update flag to the ON state (S45). Consequently, as shown in S30 in FIG. 5, the backup data is updated, and the host computer 100 is notified that an oldest point recoverable from the backup data has been changed. Note that the predetermined value in S44 may be a fixed value set in advance, or it may be, for example, a value which is dynamically changed according to the free space of a backup disk, the size of data to be written in the data disk 410, or the like.

On the other hand, if the automatic extension mode of the journal disk 430 is set (S41: YES), the processing searches an unused storage area (referred to as unused area) from disk devices connected to the journal disk 430 and judges whether or not an unused area capable of saving journal data exists (S46, S47). If an unused area has not been found (S47: NO), the processing shifts to S42 and transfers the oldest journal data to the backup disk 420 as described above to thereby secure a free space in the journal disk 430. If an unused area has been found (S47: YES), in an attempt to use the found unused area as a journal disk, the processing extends a logical size of the journal disk 430 and, at the same time, updates a disk management map (S48). Then, the processing judges whether or not a free space generated by the extension of the logical size of the journal disk 430 has reached a predetermined value (S49), and automatically extends the unused area as a storage area for journal data until the free space of the journal disk 430 reaches the predetermined value while repeating the processing of S46 to S49.

Figure 7:
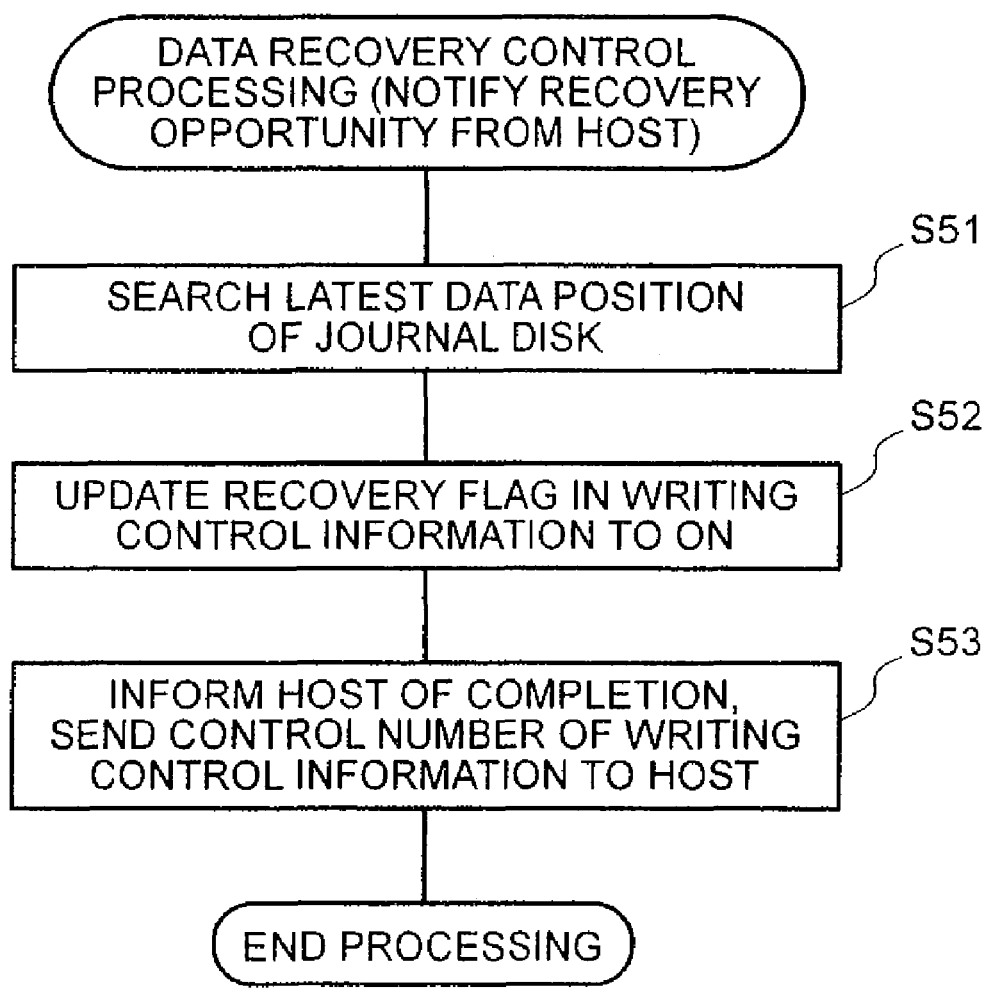
FIG. 7 is a flowchart showing data recovery control processing in the case in which a recovery opportunity is notified from the host computer.

FIG. 7 shows registration processing for a recovery opportunity instructed from the host computer 100. As described above, in this embodiment, the host computer 100 can set plural opportunities in which an arbitrary point is recoverable (restoration point).

When a recovery opportunity, which should be registered, is communicated from the host computer 100 to the disk control apparatus 200, the data recovery control processing 340 searches a position of latest data stored in the journal disk 430 (S51) and sets a recovery flag in writing control information corresponding to latest writing data to an ON state to update the recovery flag (S52). Then, the processing informs the host computer 100 that the setting of the recovery opportunity has been completed and, at the same time, notifies the host computer 100 of a control number for specifying writing control information (S53). In this way, the application 110 of the host computer 100 can instruct the setting of a recovery opportunity for data at an arbitrary point at the time of data writing.

Figure 8:
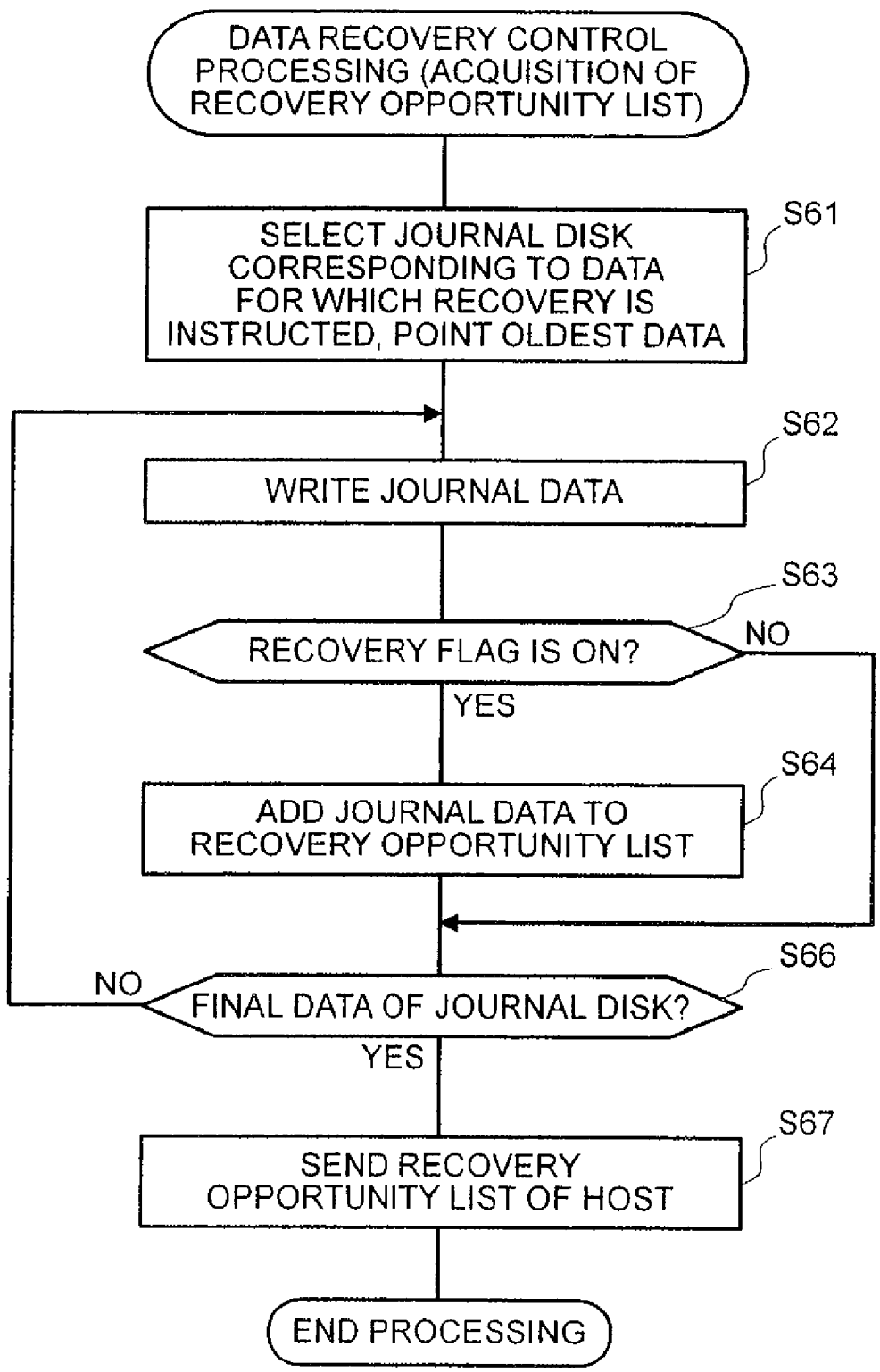
FIG. 8 is a flowchart showing data recovery control processing in the case in which transmission of a recovery opportunity list is requested from the host computer.

FIG. 8 shows transmission processing for a recovery opportunity list which returns list information of recovery opportunities in response to a request from the host computer 100. First, the processing selects a disk corresponding to data, for which recovery is instructed from the host computer 100, in the journal disk 430, and sets a pointer on oldest journal data in the selected disk (S61).

Then, the processing reads journal data from the oldest journal data (S62), checks whether or not a recovery flag in writing control information concerning the read journal data is set to an ON state (S63), and, if the recovery flag is set, adds. the read journal data to the list information of recovery opportunities and records the journal data (S64). S62 to S64 are repeated until final data stored in the disk 'selected in S61 is readout (S65). In this way, the processing sequentially checks journal data corresponding to the designated data from the oldest data to the latest data and extracts journal data, for which a recovery flag is set, to generate a recovery opportunity list. The generated recovery opportunity list is sent to the host computer 100 together with a completion report, or this is done asynchronously (S66).

Figure 9:
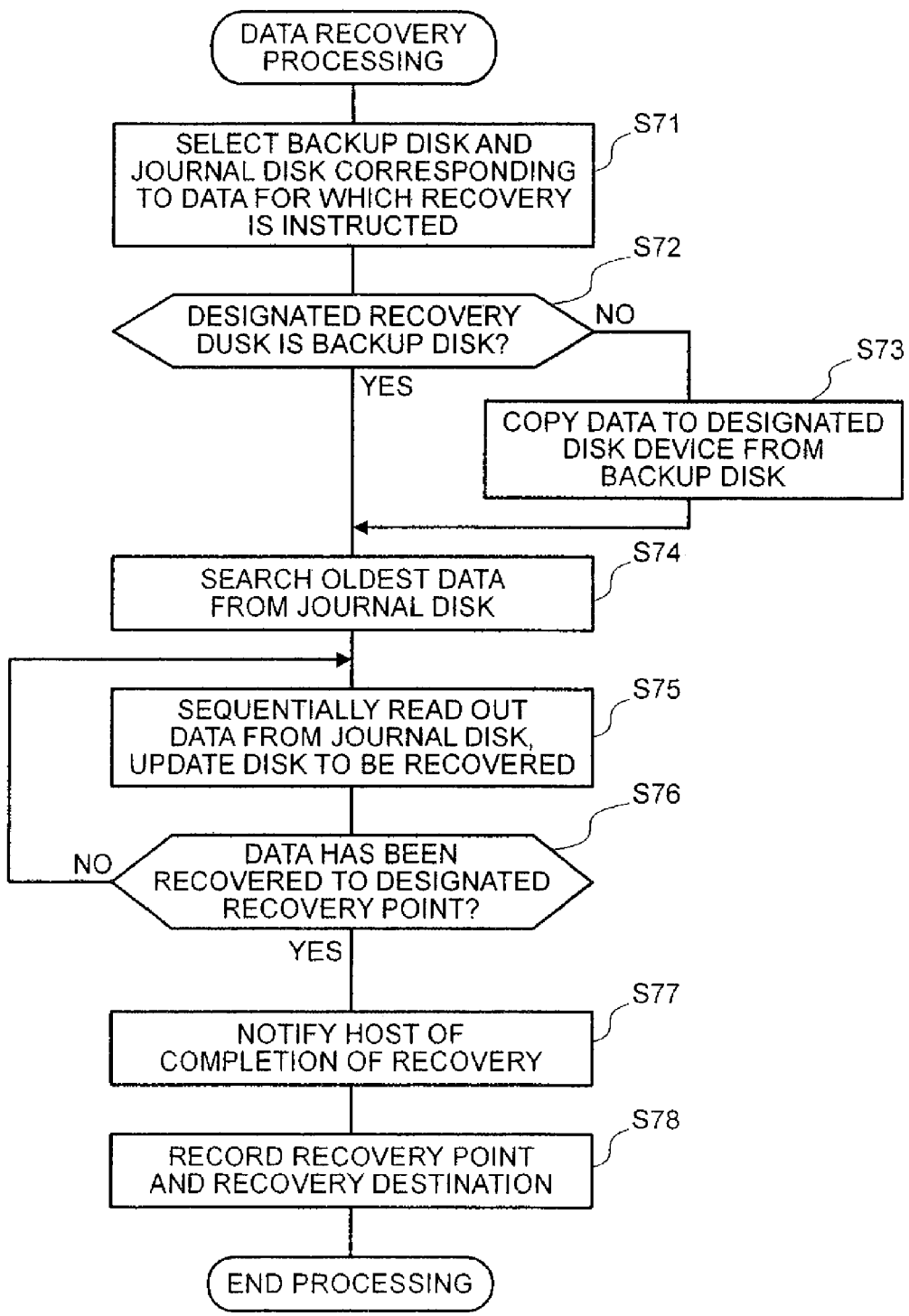
FIG. 9 is a flowchart showing data recovery processing in the case in which recovery is instructed from the host computer.

FIG. 9 shows data recovery processing. The application program 110 on the host computer 100 can instruct recovery of data to a desired point on the basis of the list information of recovery opportunities acquired by the processing shown in FIG. 8.

When a recovery instruction is issued from the host computer 100, the data recovery processing 350 selects disks corresponding to data, for which recovery is instructed, in the backup disk 420 and the journal disk 430, respectively (S71).

Next, the processing judges whether or not a disk designated as a data recovery destination by the host computer 100 is the backup disk 420 (S72). In other words, in this embodiment, data up to a designated point can be recovered to disk devices other than the backup disk 420. In the case in which the disk device designated as a recovery destination is a disk device other than the backup disk 420, the processing copies the backup data, which is stored in the backup disk 420, to the designated disk device to complete preparation of backup data to form a base for data recovery (S73).

Next, the processing searches the oldest journal data from the journal disk 430 (S74), reads out data in order from the oldest journal data, and reflects the data on stored contents of the disk designated as the recovery destination (S75). The processing reads out journal data until data is recovered to the point designated by the host computer 100 and updates the stored contents of the recovery destination disk (S76).

In the case in which data has been recovered to the designated point, the processing notifies the host computer 100 that the data recovery has been completed (S77). In addition, the processing records information, such as the recovery time and the recovery destination, in the recovery data information D10 (S78).

According to this embodiment, since recovery of data is automatically performed in an external storage, computer resources of the host computer 100 are never consumed for data recovery processing, and the efficiency of other job processing on the host computer 100 is never decreased. In particular, in the application 110 using a mass external storage, since a large quantity of data is handled, the burden imposed by the data recovery processing increases, and a large amount of computer resources are consumed. Therefore, the processing speed of other jobs performed on the host computer 100 decreases and, in addition, the processing time until completion of data recovery increases. However, in this embodiment, only a small quantity of processing, such as an instruction for setting of recovery opportunities, a request for acquisition of a recovery opportunity list, and data recovery processing is executed by the host computer 100, and actual data recovery processing is left to the external storage. Thus, the burden on the host computer 100 can be reduced. While the recovery of data is performed in the external storage, the host computer 100 can process other jobs efficiently.

In addition, since arbitrary plural points can be set as recovery opportunities and data is recoverable to a desired point, convenience is high unlike the conventional technique for simply recovering data to immediately preceding data.

Moreover, in this embodiment, since the APIs 131 to 134 for performing instruction for setting a recovery opportunity, request for acquisition of a recovery opportunity list, and the like from the host computer 100 side are prepared, a host computer becomes capable of using the external storage in accordance with the present invention simply by including these unique APIs.

In addition, in this embodiment, since journal data is automatically collected and management of a free space of the journal disk 430 is also performed in the external storage, the journal disk 430 can be prevented from being fully occupied to make data recovery impossible.

Further, in this embodiment, since the data structure of the journal data D20 is extended and the recovery flag is set in the journal data D20 (in the writing control information D30 serving as journal control information), although this structure is relatively simple, data recovery to arbitrary plural points can be realized.

Figure 10:
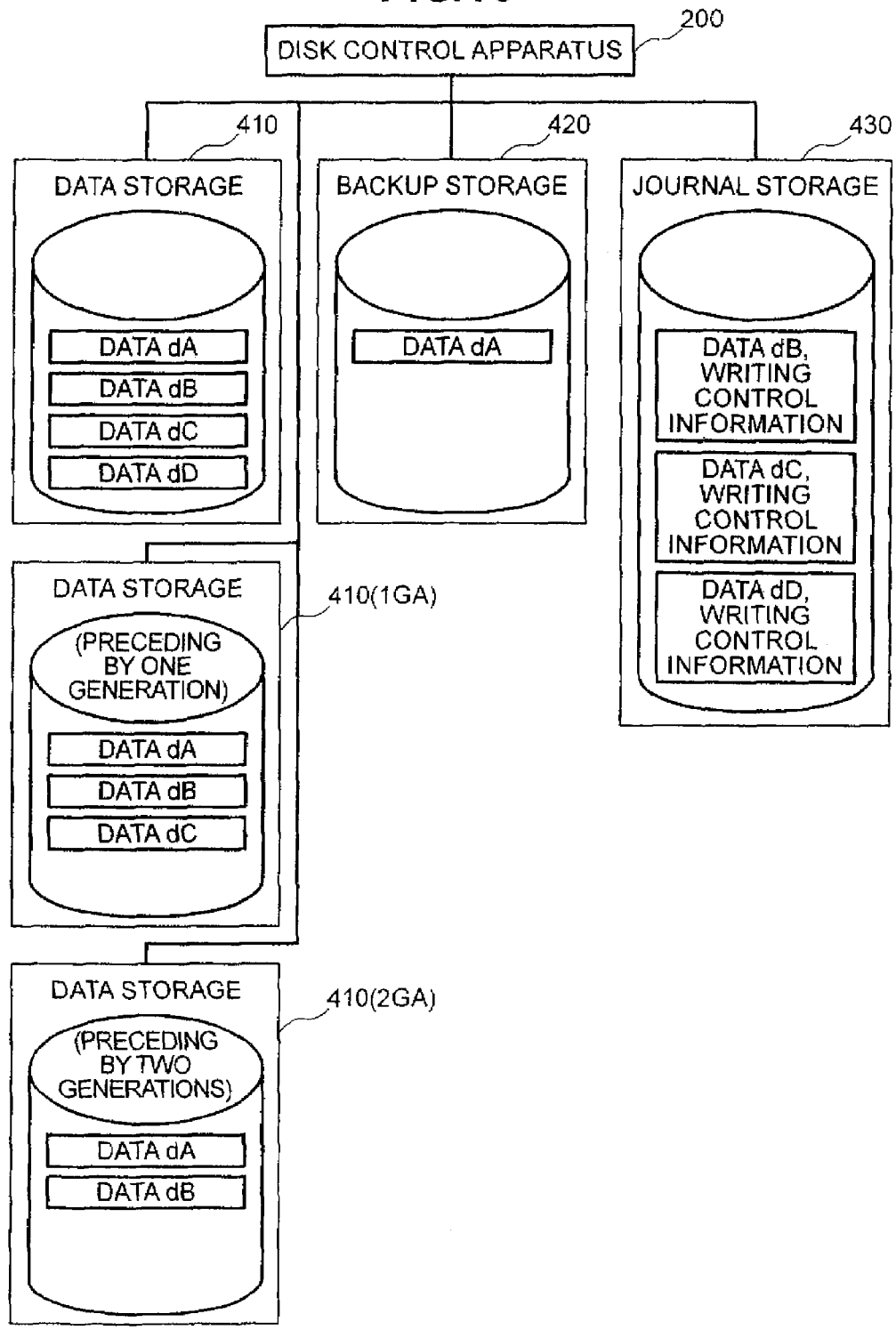
FIG. 10 is a diagram showing the case in which data management is performed in plural generations.

FIG. 10 shows a second embodiment of the present invention. In this embodiment, data management of plural generations is performed. In other words, in addition to the data disk 410 maintaining latest data, data can be managed in plural generations in such a way that the one generation precedent data disk 410 (1 GA) stores data preceding by one generation and the two generations precedent data disk 410 (2 GA) stores data preceding by two generations.

For example, after restoring recorded the contents of the backup disk 420 to the one generation precedent data disk 410 (1 GA), if journal data of data dB stored in the journal disk 430 is read out and reflected on the one generation precedent data disk 410 (1 GA), data can be dated back to data preceding by one generation. Similarly, by copying backup data in the two generations precedent data disk 410 (2 GA) and then reflecting journal data of data dB and data dC thereon, data can be dated back to data preceding by two generations. In this way, even in the case in which data is managed in plural generations, in accordance with the present invention, data of plural generations can be established and managed in the external storage without imposing a processing burden on the host computer 100.

Note that the present invention is not limited to the above-mentioned embodiments. Those skilled in the art can perform various additions, alterations, and the like within the scope of the present invention.

What is claimed is:

1. A system configured to be coupled to a plurality of computers, the system comprising:
    a data storage area being configured to store data received from at least one of the plurality of computers;
    a journal storage area being configured to store a plurality of journal data and a plurality of recoverable points, one of the plurality of journal data corresponding to an object stored in the data storage area, and one of the plurality of recoverable points being set for being able to recover data stored in the data storage area at a point corresponding to the one of the plurality of recoverable points if the one of the plurality of recoverable points is designated in future;
    a backup storage area being configured to store backup data of data stored in the data storage area at a point; and
    a control apparatus being configured to send information of the plurality of recoverable points to at least one of the plurality of computers by managing the plurality of recoverable points, and to recover data of the data storage area corresponding to a designated recoverable point, designated by the at least one of the plurality of computers which receives the information of the plurality of recoverable points from the control apparatus, by using a journal data, stored in the journal storage area and corresponding to the designated recoverable point, and the backup data stored in the backup storage area.

2. The system according to claim 1, wherein the control apparatus is configured to send the information of the plurality of recoverable points in response to a request received from the at least one of the plurality of computers which receives the information of the plurality of recoverable points.

3. The system according to claim 1, wherein the control apparatus is configured to send the information of the plurality of recoverable points to the at least one of the plurality of computers from which data are received to the data storage area.

4. The system according to claim 1, wherein the control apparatus is configured to send the information of the plurality of recoverable points to at least one host computer as the at least one of the plurality of computers which receives the information of the plurality of recoverable points from the control apparatus.

5. The system according to claim 1, wherein the system is configured to be coupled to the plurality of computers including a plurality of kinds of computers.

6. The system according to claim 1, wherein the information of the plurality of recoverable points is a list including the plurality of recoverable points.

7. The system according to claim 1, wherein one of the plurality of journal data includes information necessary for recovering data of the data storage area corresponding to one of the plurality of recoverable points.

8. The system according to claim 1, wherein at least one of the plurality of recoverable points is set based on information sent from at least one of the plurality of computers.

9. The system according to claim 1, wherein the control apparatus is configured to store the plurality of recoverable points in the control apparatus.

10. The system according to claim 1, wherein the control apparatus is configured to store the information of the plurality of recoverable points in the control apparatus.

11. The system according to claim 1, wherein one of the plurality of journal data includes data to be written in the data storage area, a write position of the data to be written in the data storage area and information corresponding to one of the plurality of recoverable points.

12. The system according to claim 1, wherein the data storage area is a first logical volume corresponding to at least a portion of a plurality of disk drives, the journal storage area is a second logical volume corresponding to at least a portion of the plurality of disk drives, and the backup storage area is a third logical volume corresponding to at least a portion of the plurality of disk drives.

13. The system according to claim 1, wherein the control apparatus is configured to select one or more of the plurality of journal data in the journal storage area for recovering the data of the data storage area corresponding to the designated recoverable point.

14. A control apparatus comprising:
at least one first unit adapted to be coupled to a plurality of computers; and
at least one second unit adapted to be coupled to a journal storage area and a backup storage area, the journal storage area storing a plurality of journal data corresponding to a plurality of objects stored in a data storage area, the backup storage area storing backup data of data stored in the data storage area at a time,
wherein the control apparatus is adapted to send information of a plurality of recoverable points to at least one of the plurality of computers, one of the plurality of recoverable points being set for being able to recover data of the data storage area at a time corresponding to the one of the plurality of recoverable points if the one of the plurality of recoverable points is designated,
wherein the control apparatus is adapted to recover data of the data storage area at a time corresponding to a designated recoverable point, designated by the at least one of the plurality of computers to which the information of the plurality of recoverable points is sent from the control apparatus, by using one or more of the plurality of journal data stored in the journal storage area and the backup data stored in the backup storage area.

15. The control apparatus according to claim 14, wherein the control apparatus is adapted to send the information of the plurality of recoverable points in response to a request to be received from the at least one of the plurality of computers to which the information of the plurality of recoverable points is sent.

16. The control apparatus according to claim 14, wherein the control apparatus is adapted to send the information of the plurality of recoverable points to at least one host computer as the at least one of the plurality of computers to which the information of the plurality of recoverable points is sent from the control apparatus.

17. The control apparatus according to claim 14, wherein the at least one first unit is adapted to be coupled to the plurality of computers including a plurality of kind of computers.

18. The control apparatus according to claim 14, wherein the information of the plurality of recoverable points is a list.

19. The control apparatus according to claim 14, wherein the control apparatus is adapted to recover the data of the data storage area at the time by using the one or more of the plurality of journal data, one of the plurality of journal data including information necessary for recovering data of the data storage area at a time corresponding to one of the plurality of recoverable points.

20. The control apparatus according to claim 14, wherein the control apparatus is adapted to send the information of the plurality of recoverable points, at least one of the plurality of recoverable points being set based on information sent from at least one of the plurality of computers.

21. The control apparatus according to claim 14, wherein the control apparatus is adapted to store the plurality of recoverable points in the control apparatus.

22. The control apparatus according to claim 14, wherein the control apparatus is adapted to store the information of the plurality of recoverable points in the control apparatus.

23. The control apparatus according to claim 14, wherein the control apparatus is adapted to recover the data of the data storage area at the time by using the one or more of the plurality of journal data, one of the plurality of journal data including data to be written in the data storage area, a write position of the data to be written in the data storage area and information corresponding to one of the plurality of recoverable points.

24. The control apparatus according to claim 14, wherein the control apparatus is adapted to recover data of the data storage area at the time corresponding to the designated recoverable point by using the one or more of the plurality of journal data stored in the journal storage area being a first logical volume corresponding to at least a portion of a plurality of disk drives, and the backup data stored in the backup storage area being a second logical volume corresponding to at least a portion of the plurality of disk drives.

25. The system according to claim 1, wherein the control apparatus is configured to receive information of a recoverable point other than a request for committing data in the data storage area, and
wherein the control apparatus is configured to set the one of the plurality of recoverable points based on the received information of the recoverable point.

26. The system according to claim 1, wherein the control apparatus is configured to receive information of a recoverable point other than a data update request for updating data in the data storage area, and
wherein the control apparatus is configured to set the one of the plurality of recoverable points based on the received information of the recoverable point.

27. The control apparatus according to claim 14, wherein the control apparatus is adapted to receive information of a recoverable point other than a request for committing data in the data storage area, and
wherein the control apparatus is adapted to set the one of the plurality of recoverable points based on the received information of the recoverable point.

28. The apparatus according to claim 14, wherein the control apparatus is adapted to receive information of a recoverable point other than a data update request for updating data in the data storage area, and wherein the control apparatus is adapted to set the one of the plurality of recoverable points based on the received information of the recoverable point.

29. A control apparatus comprising:

at least one unit adapted to be coupled to a plurality of computers, a journal storage area and a backup storage area, the journal storage area storing a plurality of journal data corresponding to a plurality of objects stored in a data storage area, the backup storage area storing backup data of data stored in the data storage area at a time, wherein the control apparatus is adapted to receive information of a recoverable point other than a request for committing data in the data storage area, wherein the control apparatus is adapted to set one of a plurality of recoverable points based on the received information of the recoverable point, so that the control apparatus is able to recover data of the data storage area at a time corresponding to the one of the plurality of recoverable points if the one of the plurality of recoverable points is designated, wherein the control apparatus is adapted to send information of the plurality of recoverable points to at least one of the plurality of computers, and wherein the control apparatus is adapted to recover data of the data storage area at a time corresponding to a designated recoverable point, designated by the at least one of the plurality of computers to which the information of the plurality of recoverable points is sent from the control apparatus, by using one or more of the plurality of journal data stored in the journal storage area and the backup data stored in the backup storage area.

30. The control apparatus according to claim 29, wherein the control apparatus is adapted to send the information of the plurality of recoverable points in response to a request to be received from the at least one of the plurality of computers to which the information of the plurality of recoverable points is sent.

31. The control apparatus according to claim 29, wherein the control apparatus is adapted to send the information of the plurality of recoverable points to at least one host computer as the at least one of the plurality of computers to which the information of the plurality of recoverable points is sent from the control apparatus.

32. The apparatus according to claim 29, wherein the at least one unit is adapted to be coupled to the plurality of computers including a plurality of kind of computers.

33. The control apparatus according to claim 29, wherein the information of the plurality of recoverable points is a list.

34. The control apparatus according to claim 29, wherein the control apparatus is adapted to recover the data of the data storage area at the time by using the one or more of the plurality of journal data, one of the plurality of journal data including information necessary for recovering data of the data storage area at a time corresponding to one of the plurality of recoverable points.

35. The control apparatus according to claim 29, wherein the control apparatus is adapted to send the information of the plurality of recoverable points, at least one of the plurality of recoverable points being set based on information sent from at least one of the plurality of computers.

36. The control apparatus according to claim 29, wherein the control apparatus is adapted to store the plurality of recoverable points in the control apparatus.

37. The control apparatus according to claim 29, wherein the control apparatus is adapted to store the information of the plurality of recoverable points in the control apparatus.

38. The control apparatus according to claim 29, wherein the control apparatus is adapted to recover the data of the data storage area at the time by using the one or more of the plurality of journal data, one of the plurality of journal data including data to be written in the data storage area, a write position of the data to be written in the data storage area and information corresponding to one of the plurality of recoverable points.

39. The control apparatus according to claim 29, wherein the control apparatus is adapted to recover data of the data storage area at the time corresponding to the designated recoverable point by using the one or more of the plurality of journal data stored in the journal storage area being a first logical volume corresponding to at least a portion of a plurality of disk drives, and the backup data stored in the backup storage area being a second logical volume corresponding to at least a portion of the plurality of disk drives.

40. The control apparatus according to claim 29, wherein the control apparatus is adapted to set the one of the plurality of recoverable points at the timing, which is different from a timing of receiving a request for committing data in the data storage area.

41. The control apparatus according to claim 29, wherein the control apparatus is adapted to receive the information of the recoverable point other than a data update request for updating data in the data storage area.

42. The system according to claim 1, wherein one or more of the plurality of journal data stored in the journal storage area are deleted from the journal storage area, after data corresponding to the one or more of the plurality of journal data are written to the backup storage area.

43. The control apparatus according to claim 14, wherein at least one of the plurality of journal data stored in the journal storage area are deleted from the journal storage area, after data corresponding to the at least one of the plurality of journal data are written to the backup storage area.

44. The control apparatus according to claim 29, wherein at least one of the plurality of journal data stored in the journal storage area are deleted from the journal storage area, after data corresponding to the at least one of the plurality of journal data are written to the backup storage area.

* * * * *